(12) United States Patent
Rishton et al.

(10) Patent No.: US 6,457,248 B1
(45) Date of Patent: Oct. 1, 2002

(54) MEASUREMENT OF INCLINATION BETWEEN SPACED-APART WORKPIECE SURFACES

(76) Inventors: John E. Rishton, 616 S. Saint Malo St., West Covina, CA (US) 91790; James F. Rishton, 13550 Martinique Dr., Chino Hills, CA (US) 91709

( * ) Notice: Subject to any disclaimer, the term of this patent is extended or adjusted under 35 U.S.C. 154(b) by 50 days.

(21) Appl. No.: 09/613,188

(22) Filed: Jul. 10, 2000

(51) Int. Cl.[7] ................................................ G01B 5/14
(52) U.S. Cl. .......................................... 33/531; 33/567
(58) Field of Search ............................. 33/613, 1 BB, 33/501.05, 501.06, 501.08, 501.16, 502, 545, 567, 567.1, 531, 532

(56) References Cited

U.S. PATENT DOCUMENTS

| | | |
|---|---|---|
| 1,411,911 A | 4/1922 | Desbains |
| 2,105,054 A * | 1/1938 | Posthuma ..................... 33/567 |
| 2,642,670 A | 6/1953 | Dow |
| 2,712,695 A | 7/1955 | Aller |
| 2,739,389 A | 3/1956 | Carter |
| 2,831,256 A * | 4/1958 | Werle ........................... 33/567 |
| 3,422,541 A | 1/1969 | Ott |
| 4,112,581 A * | 9/1978 | Hornsby .................. 33/501.06 |
| 4,336,656 A * | 6/1982 | Lewis .......................... 33/532 |
| 4,553,333 A * | 11/1985 | Shurtliff ........................ 33/613 |
| 6,009,633 A * | 1/2000 | Novak ........................ 33/567.1 |

* cited by examiner

Primary Examiner—Christopher W. Fulton
(74) Attorney, Agent, or Firm—Boniard I. Brown

(57) ABSTRACT

Attachment ears for use with a predetermined assembly of Johansson blocks, with the ears disposed at opposite ends of the assembly, for measurement of an inclination between spaced-apart surfaces of a workpiece. An indicator gage has a stationary stylus to contact a surface of one ear, and an indicator stylus to contact the inclined surface of the other ear and moveable thereon to define an arc with the stationary stylus as a fulcrum to establish an apex reading of the indicator. The gage is transferred to the workpiece with the stationary stylus and the indicator stylus contacting the two spaced-apart surfaces, and the indicator gage is moved about to provide a gage reading to determine a thickness of material to be removed from the workpiece.

22 Claims, 5 Drawing Sheets

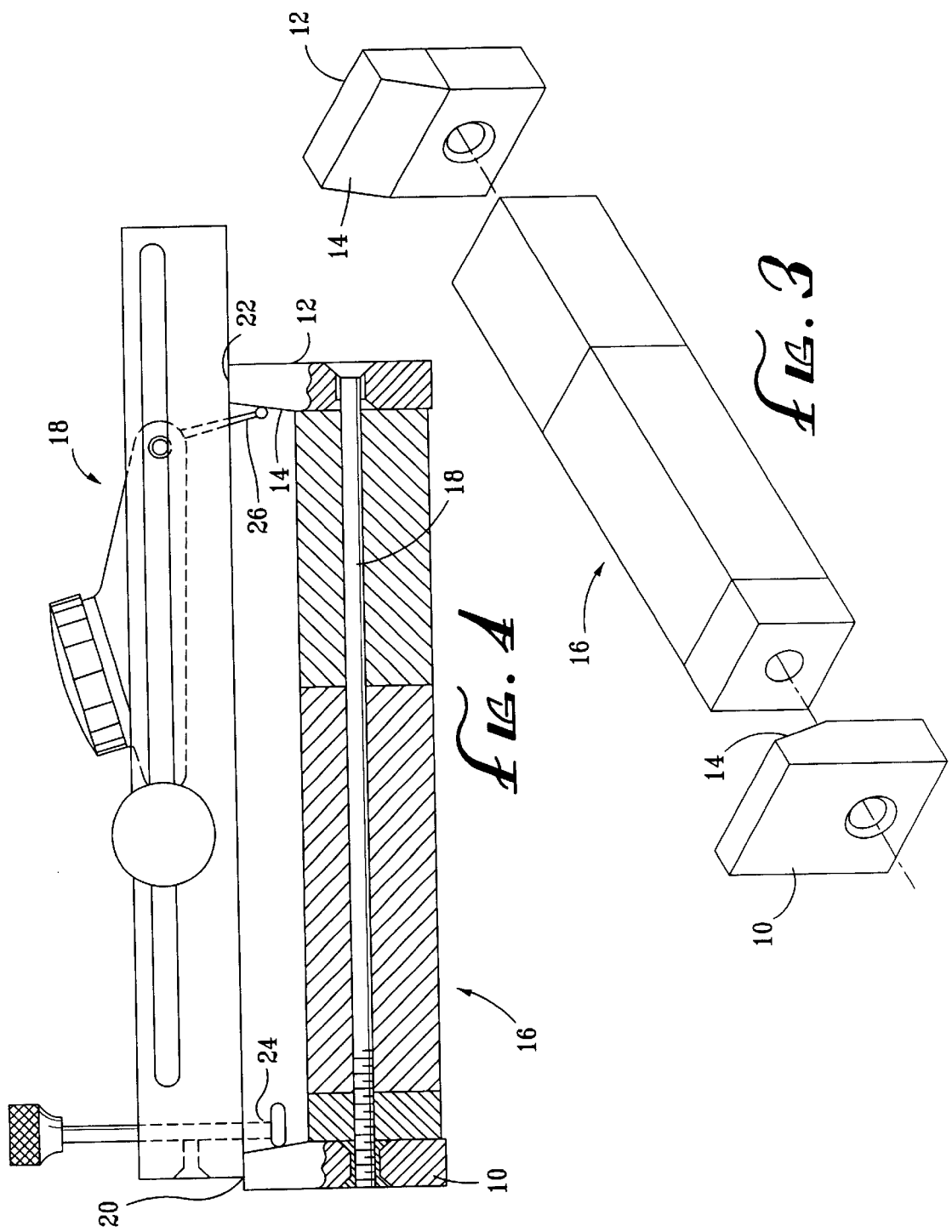

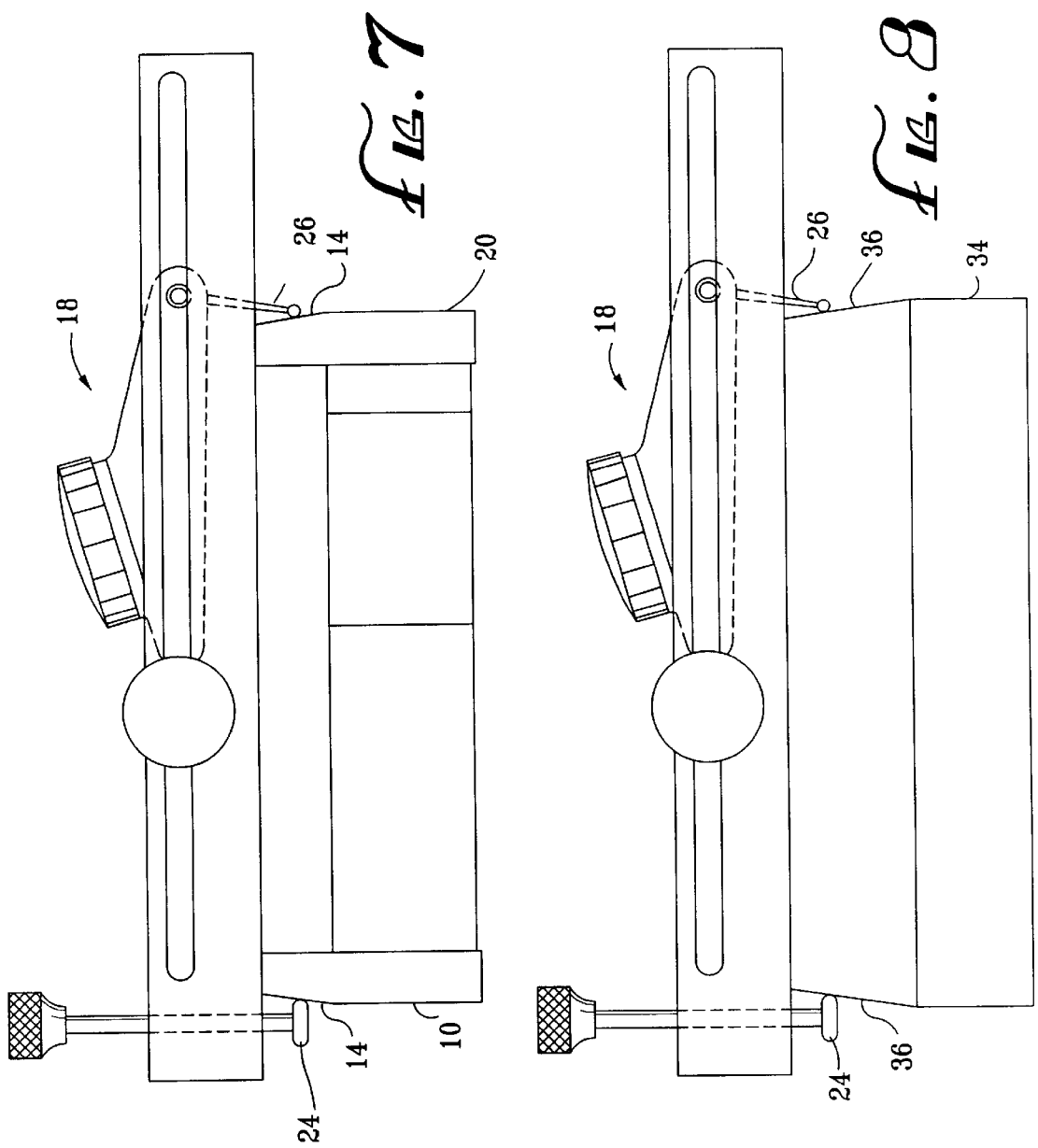

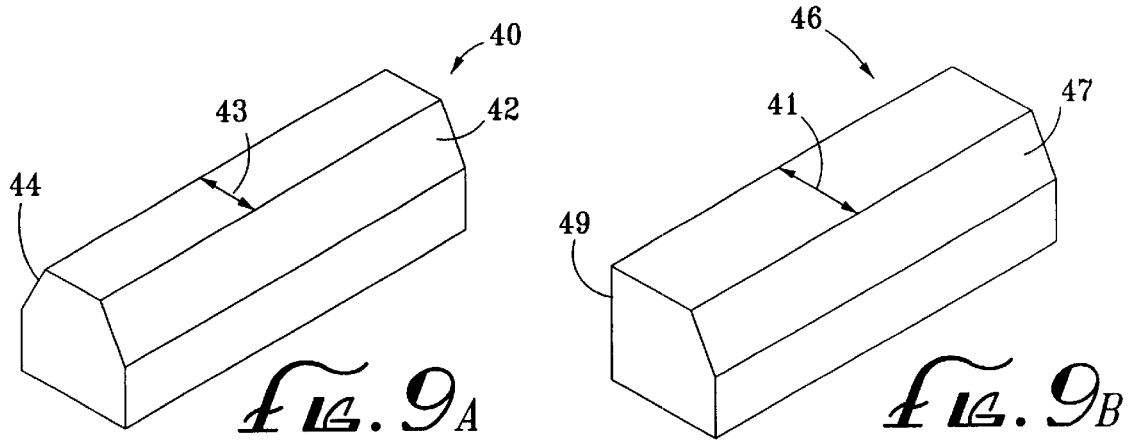
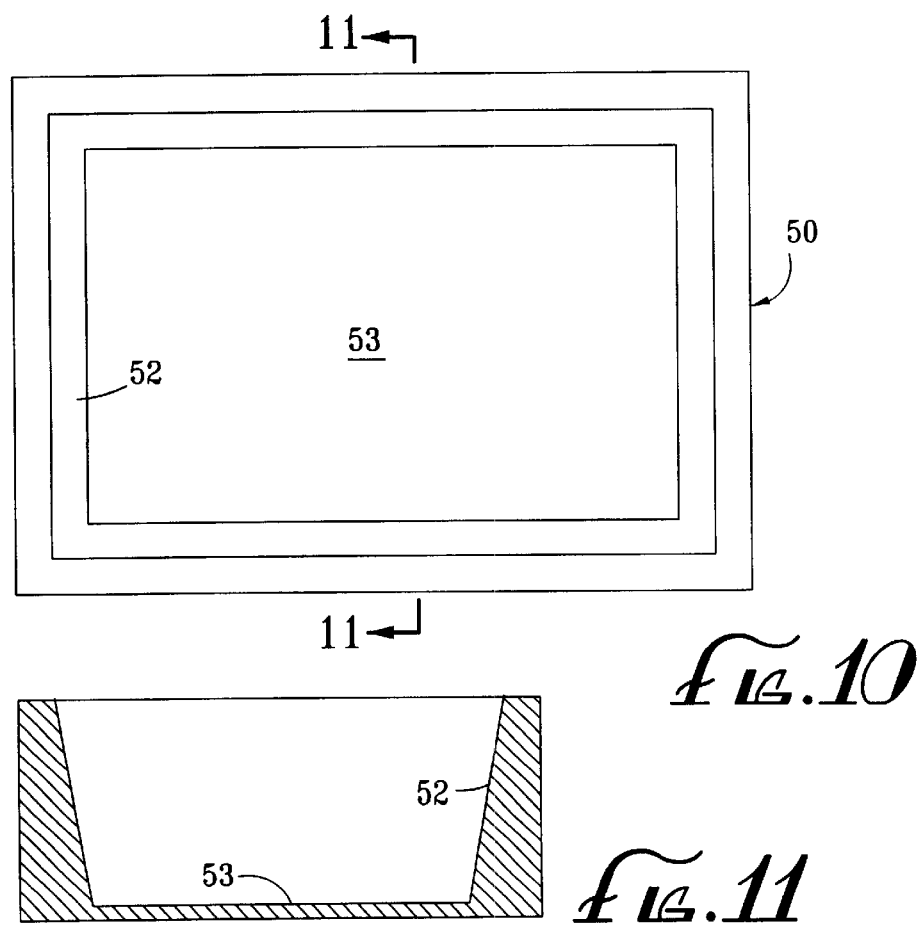

MEASUREMENT OF INCLINATION BETWEEN SPACED-APART WORKPIECE SURFACES

BACKGROUND AND SUMMARY OF THE INVENTION

In the prior art, measurement of the inclination or angle between spaced-apart surfaces of a workpiece has involved complicated procedures, trigonometric calculations, and substantial time-consumption. Such spaced-apart surfaces are typically male and female conical surfaces, inclined surfaces of bar members, and inclined inner walls of injection mold frames and pockets.

The present invention provides means and procedures which eliminate complex calculations, and which substantially reduce the time expended by professional toolmakers. The invention provides a pair of ear attachments, each having an inclined upper side surface, disposed at opposite ends of an assembly of selected Johansson blocks to provide a predetermined overall dimension.

A bore gage such as those long utilized with conical tapers, etc., is positioned on the assembly with its stationary stylus disposed at an upper side surface of one ear, and its indicator stylus disposed on an upper side surface of the other ear. The indicator stylus is moved about the ear surface to establish an apex indication of the gage. The gage is then removed from the blocks assembly and disposed on the workpiece, with the stationary stylus as a fulcrum in contact of one of the spaced-apart surfaces, and with the indicator stylus contacting the other ear surface and being moved thereabout to provide an indicator reading relative to the apex reading to indicate the amount of material to be removed from the workpiece.

BRIEF DESCRIPTION OF THE DRAWINGS

FIG. 3 is an exploded perspective view of an assembly of Johansson blocks in association with accessory ears of the invention;

FIG. 4 is an elevational view of the Johansson blocks and accessory ears of FIG. 3, shown in section, with a bore gage utilized with the invention;

FIG. 7 is an elevational view of the gage of FIG. 4 in operative relation with the assembly of Johansson blocks and accessory ears, the ears having their inclined surfaces facing outwardly of the assembly;

FIG. 8 is an elevational view showing the gage of FIGS. 4 and 7 in operative relation with the workpiece of FIG. 1B;

FIGS. 9A and 9B are perspective views of bar workpieces, their opposed surfaces having relative inclinations, with which the present invention may be utilized;

FIG. 10 is a plan view of a frame device having an inclined inner wall, with which the present invention may be utilized, and FIG. 11 is a sectional view taken at line 11—11 in FIG. 10.

DESCRIPTION OF THE PREFERRED EMBODIMENT

Figure 1A:
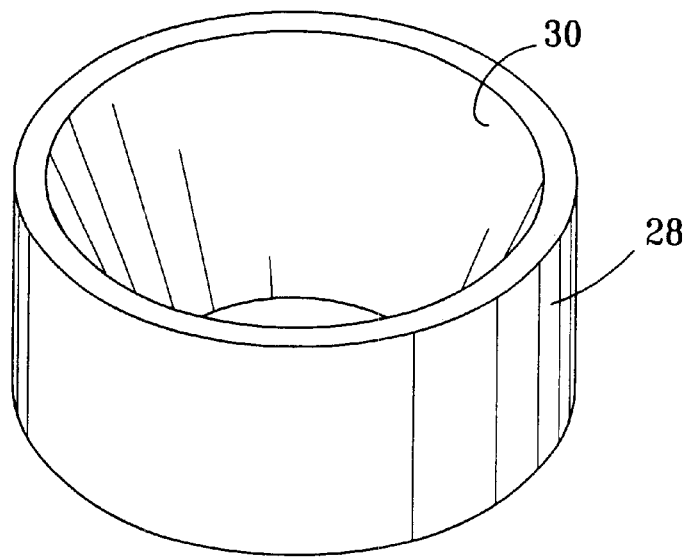
FIGS. 1A and 1B are perspective views of workpieces with which the present invention may be utilized, one having a female conical surface and the other having a male conical surface.
Figure 1B:
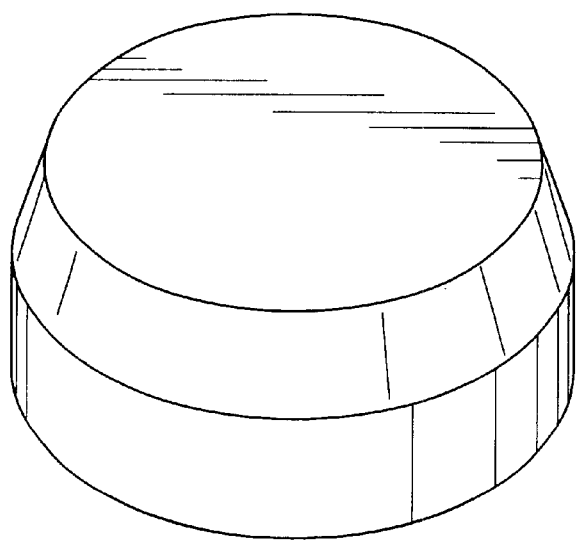

The present invention provides accessory ears, herein termed "ears" for Johansson blocks, which ears have upper inclined surfaces for the measurement of conical diameters, male or female, such as shown in FIGS. 1A and 1B.

Figures 2A, 2B:
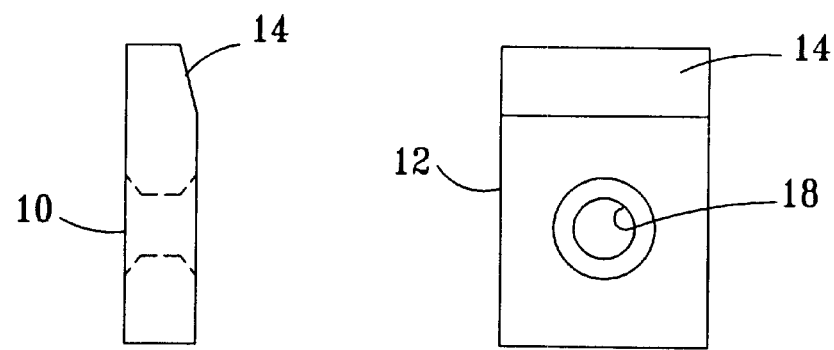
FIGS. 2A and 2B are respectively front elevational and side views of an accessory ear of the invention having an upper inclined side surface portion.

FIGS. 2A and 2B show accessories or ears which upper portions define inclined surfaces, typically for the measurement of the internal or external taper of conical or frusto-conical surfaces. The inclined upper surfaces of the ears correspond to the datum face of a workpiece or part to be fabricated.

As is known in the art, such conical or inclined surfaces are very difficult to accurately measure, and somewhat complicated mathematics and trigonometry calculations are required in the prior art in the process of measurement and fabrication of accurate conical surfaces. The present invention eliminates the necessity for such calculations as well as any necessity for fabricating or providing expensive plug and ring gages for respective jobs.

The inclined upper surfaces of the accessory ears enables the utilization of an exact master gage, typically a shallow bore gage, to measure male or female conical diameters in fabrication of a workpiece, A conventional shallow bore gage may typically be utilized.

Referring to the drawings, in accordance with the invention, a pair of ears 10, 12 (FIGS. 2A, 2B,) are selected from a collection of ears of appropriate thickness and having inclined upper portions 14 accurately define the correct angle of inclination. A combination of Johansson blocks 16 is assembled to provide the correct predetermined overall dimension in combination with the ears dimension, one ear being at each end of the assembly (FIGS. 3 and 4). The entire assembly is secured together by a threaded rod fastener assembly 18 extending through openings in the blocks and ears, as indicated in FIG. 4.

Regarding dimensions, it is to be noted that for internal female conical tapers, such as that shown in FIG. 1A, 0.100" is subtracted from the nominal workpiece diameter; and for external male conical tapers, such as that of FIG. 1B, 0.600" is subtracted from workpiece diameter.

Utilizing the prescribed overall dimension, typically the conical diameter, and utilizing the prescribed accurate angle, appropriate ears are utilized and the gage is set to such dimension.

The shallow bore gage is positioned with its base face resting atop the top surfaces 20, 22 of the ears.

The stationary stylus 24 and the indicator stylus 26 of the gage are positioned with each in contact with the upper inclined surface 14 of one of the ears 10, 12. It is to be noted that the contact point of the indicator stylus and the contact point of the stationary stylus may be at any point on an inclined surface of the ear with which it is engaged, in order to provide an accurate setting, as hereinafter outlined.

In the arrangement of FIG. 4, the dial bore gage is utilized to transfer a dimension between the inclined surfaces of the ears to a workpiece in the measurement between the inclined surfaces which face each other. In the arrangement of FIG. 7, the ears 10, 20 have their inclined upper surfaces facing oppositely or outwardly of the assembly. In either arrangement, as required, the stationary stylus 24 of the gage is positioned in contact with the inclined surface 14 at one of the ears, and the indicator stylus is similarly disposed in contact with the opposite ear or inclined surface 14 at the opposite side of the assembly. As stated earlier, the stationary stylus and indicator stylus may be in contact at any point on the inclined surfaces of the ears.

With the stationary stylus 24 serving as a fulcrum or pivot point for an arc, the indicator stylus is moved back and forth about the inclined surface of the ear to establish an "apex" reading on the indicator of the gage, whereupon the operator sets the dial of the gage at "zero". The moving of the indicator stylus relative to the ear inclined surface with the stationary stylus serving as a pivot or fulcrum, is indicated in broken lines in FIG. 5.

Figure 6:
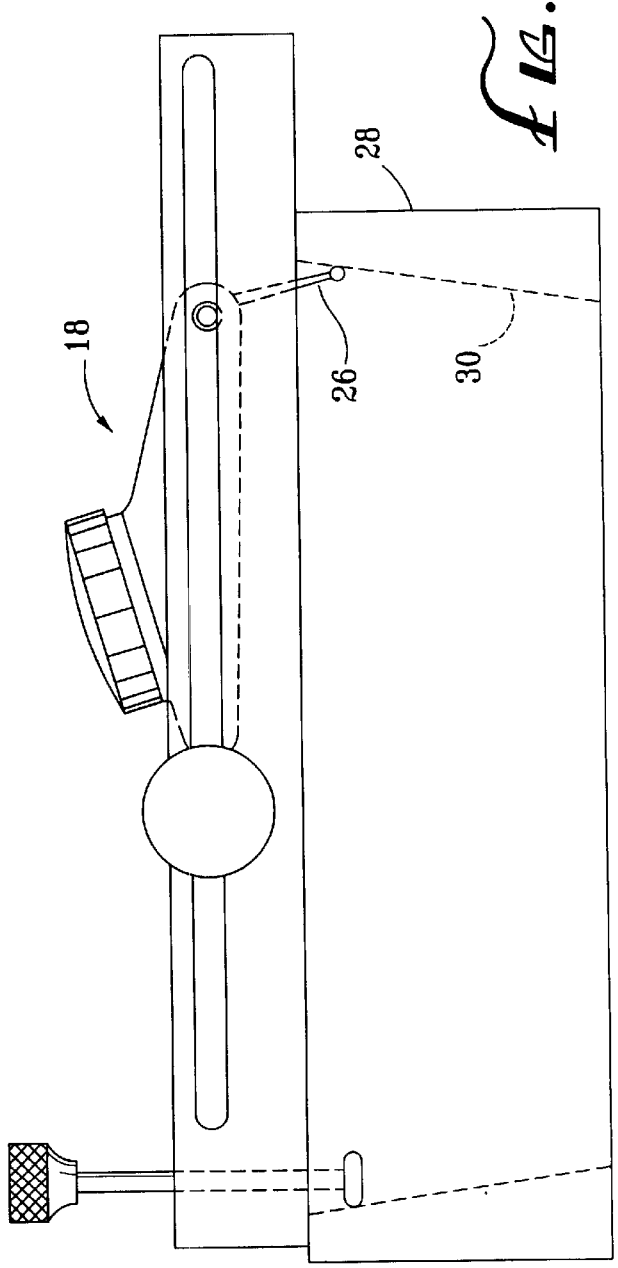
FIG. 6 is an elevational view showing the bore gage of FIG. 4 in operative relation with the workpiece of FIG. 1A.

Next, as shown in FIG. 6, the bore gage is then removed from the Johansson block assembly and is applied to a workpiece 28 being fabricated, in the same manner as the gage was applied in inclined surfaces 14 of the ears of the assembly. The gage dial indicator has already been set at "zero" corresponding to the apex reading established as outlined above.

With the indicator stylus 26 positioned in contact with the inclined conical surface 30 of the workpiece, and with the stationary stylus firmly positioned against an opposite inclined conical surface of the workpiece, the indicator stylus is moved about on the workpiece surface to establish an "apex" reading on the gage indicator. The gage setting enables replication of the dimension of the workpiece being fabricated or machined. The gage is carefully applied to the workpiece, as indicated in FIG. 6, with the base face of the gage pressing against the upper face or faces of the workpiece. With the stationary stylus firmly positioned against the conical tapered surface of the workpiece, and with the end portion of the indicator stylus positioned at an opposite conical surface of the workpiece, the indicator stylus is moved back and forth on the surface to establish that apex. This determines the dimension of size of the surface to be machined and establishes the amount of material to be removed or to be prescribed and to be achieved in order to arrive at a final required size within tolerance.

FIG. 8 shows a similar procedure relative to the exterior male conical surface of a workpiece 34 having upper frusto conical surface 36.

FIGS. 9A and 9B illustrate generally rectilinear bar workpieces with which the present invention may be utilized. Bar 40 of FIG. 9A has opposite upper inclined side surface portions 42, 44, whereas bar 46 of FIG. 9B has an upper inclined side surface at only one side 47, the opposite side 49 being flat.

The measurement of the angle or inclination between the opposite side surfaces of the bar 40 or the bar 46 involve the same procedures as for the conical diameter measurements hereinbefore described. The set up for a bar involves the same procedure as for measurement of the conical diameter, and measurement relative to a bar is the measurement of the angle between the upper opposite side portions of the bar. Measurement by means of the gage stationary stylus and indicator stylus are the same as the measurement of a conical diameter, with the stylus engagement being at the upper edge portion of the side surfaces of the bar, as indicated at 41 in FIG. 9B and at 43 in FIG. 9A.

Referring to FIGS. 10 and 11, there is shown what is known in the art as a pocket 50 which typically serves as a frame for the mounting thereon of mold components for plastic injection molding. FIG. 11 shows in cross-section an inclined surface 52 which extends all about the interior of the pocket or frame. The pocket has a bottom wall 53. It may be noted that when there is no bottom wall, the device is generally termed a "window" and serves the same general purpose as a pocket.

Figure 5:
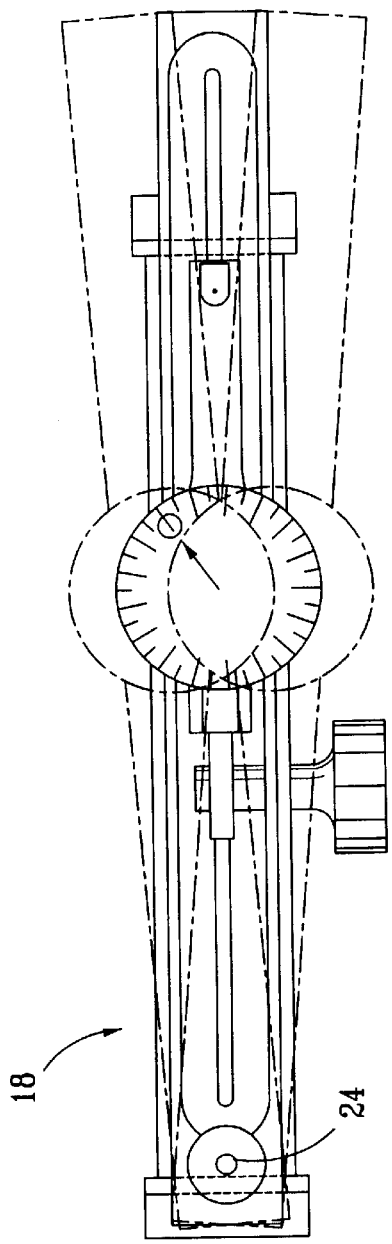
FIG. 5 is a top view of the gage of FIG. 4, showing in broken lines different positions of the gage during movement of its indicator stylus about a portion of an accessory ear.

The procedure for the measurement of the inclination for angle between opposite sides of the inclined surface 52 is the same as for the measurement of the angle inclination between opposite portions of a female conical surface. FIGS. 4, 5 and 6 of the drawings are applicable directly to the procedure involved, and the same type gage with indicator stylus and a stationary stylus is utilized in the same manner.

It will be understood that various changes and modifications may be made from the preferred embodiments discussed above without departing from the scope of the present invention, which is established by the following claims and equivalents thereof.

What is claimed is:

1. Attachment ears in assembly with Johansson blocks for measurement of inclinations between spaced-apart conical surfaces of a workpiece being fabricated, comprising:

an assembly of Johansson blocks of predetermined overall dimension, first and second ears, one disposed at each end of said assembly of Johansson blocks, said first and second ears having upper side surfaces with respective predetermined inclinations, means to retain the Johansson blocks and said ears in assembled relation, the sum of the inclinations between the upper side surfaces of the first and second ears defining an angular conical inclination to be provided on said workpiece, a gage having an indicator stylus, a stationary stylus and an indicator, said gage being positionable on said assembly of Johansson blocks and ears with its stationary stylus contacting the upper side surface of the first ear, and having its indicator stylus contacting the upper side surface of the second ear for movement thereof on said inclined conical surface to define an arc having the stationary stylus as a fulcrum to define an arc apex for setting an indicator of the gage as a reference to enable a reading of an angular dimension of the workpiece surfaces to determine the thickness of material to be removed therefrom.

2. The assembly of claim 1, wherein:

said means to retain the Johansson blocks and the ears in assembled relations comprises a threaded tie rod extending through openings in the blocks and the ears.

3. The combination according to claim 1, wherein said gage is a shallow bore gage.

4. The combination according to claim 1, wherein said gage is positionable atop upper surfaces of said ears.

5. The combination according to claim 1, wherein:

the sum of the inclinations of the inclined surfaces of the first and second ears corresponds to the angular inclination between workpiece surfaces to be fabricated.

6. The combination according to claim 1, wherein:

said first and second ears of upper side surfaces of predetermined inclinations define the included angle to be fabricated in the workpiece.

7. The combination according to claim 1, wherein:

the assembly of Johansson blocks and the first and second ears defines a dimension to be defined in the workpiece being fabricated.

8. The assembly according to claim 1, wherein:
said workpiece comprises a conical surface to be fabricated, and wherein said conical surface is (1) male with the inclined surfaces of the ears facing outwardly of the assembly, (2) female and the inclined surfaces of the ears face inwardly of the assembly.

9. The combination according to claim 1, wherein said workpiece is a bar member having at least one inclined upper side portion, and wherein said first and second attachment ears define the angular conical inclination of the at least one portion.

10. The combination according to claim 1, wherein said workpiece is a bar member having two opposite upper inclined surfaces, and wherein said first and second ears define the angular inclination between two opposite upper inclined surfaces.

11. The combination according to claim 1, wherein said workpiece comprises:
a frame of rectilinear configuration having oppositely disposed inclined inner wall portions and wherein the first and second ears define the inclination between the inner wall portions.

12. Attachment ears in assembly with Johansson blocks for measurement of conical surface diameters and inclined surfaces, for a workpiece to be fabricated, comprising:
first and second ears, one disposed at each end of a predetermined assembly of Johansson blocks,
means for retaining the Johansson blocks and the ears in assembled relation,
each of the first and second ears having an inclined surface portion, the sum of the inclination angles of the first and second ears defining the angular inclination between conical surfaces to be fabricated on said workpiece,
a gage comprising an indicator stylus, a stationary stylus and a dimension indicator,
said gage being positionable on the assembly with the stationary stylus contacting the inclined surface of first ear and its indicator stylus contacting the inclined surface of the second ear for movement of the indicator stylus on the inclined surface to define an arc having the stationary stylus as a fulcrum to determine an arc apex for setting an indicator of the gage as a reference to enable a reading of an angular dimension of the workpiece surfaces to determine the thickness of material to be removed therefrom.

13. A combination according to claim 12, wherein the Johansson blocks and the ears are secured together by a threaded tie rod extending through openings in the blocks and the ears.

14. A combination according to claim 12, wherein the conical workpiece surface being machined is (1) male, and the inclined surfaces of the ears face outwardly of the assembly, (2) female, and the inclined surfaces of the ears face inwardly.

15. A combination according to claim 12, wherein said gage is a conventional shallow bore gage.

16. A combination according to claim 12, wherein said gage is disposed atop top surfaces of said ears.

17. A combination according to claim 12, wherein:
the sum of the inclinations of the inclined surfaces of the first and second ears corresponds to the angular inclination between the conical surfaces being fabricated.

18. A combination according to claim 12, wherein:
said first and second ears are selected so that the total of their inclinations defines the included angle to be fabricated on the workpiece.

19. A combination according to claim 12, wherein the dimension of said Johansson blocks and the first and second ears in assembly corresponds to the dimension to be defined on the workpiece being fabricated.

20. A method for angle measurement between first and second spaced-apart conical surfaces of a workpiece to be fabricated, comprising:
providing an assembly of Johansson blocks of selected overall dimension to establish a predetermined dimension,
providing first and second attachment ears of selected dimensions, one at each end of said Johansson blocks assembly, to establish a predetermined accurate distance between surfaces of the first and second ears, each ear having an inclined upper side surface,
disposing an indicator gage on said assembly with an indicator stylus thereof contacting the inclined surface of the first ear, and its stationary stylus contacting the inclined surface of the second ear,
moving the indicator stylus about said inclined surface of the first ear to establish an apex reading of the indicator gage,
positioning the indicator gage on said workpiece,
disposing the stationary stylus on said second surface of the workpiece, and disposing the indicator stylus in contact with the first surface of the workpiece, and
moving the indicator stylus about said first surface to provide an indicator reading indicative of the amount of material to be removed from the workpiece to provided a predetermined angular inclination between said first and second conical surfaces of the workpiece.

21. A method according to claim 20, wherein said upper inclined surfaces of the first and second ears face (1) inwardly of the assembly, (2) outwardly of the assembly.

22. A method according to claim 20, wherein the total of the inclinations of the two inclined surfaces of the ears together define an included angle between the first and second workpiece surfaces to be machined.

* * * * *